(12) United States Patent
Wang

(10) Patent No.: US 6,710,323 B2
(45) Date of Patent: Mar. 23, 2004

(54) OPTICAL SIGNAL DETECTION METHOD AND APPARATUS FOR A COMPUTER MOUSE

(75) Inventor: Yen-Hui Wang, Hsinchu (TW)

(73) Assignee: King Billion Electronics Co., Ltd., Hsinchu Hsien (TW)

( * ) Notice: Subject to any disclaimer, the term of this patent is extended or adjusted under 35 U.S.C. 154(b) by 88 days.

(21) Appl. No.: 10/152,636

(22) Filed: May 23, 2002

(65) Prior Publication Data

US 2003/0218121 A1 Nov. 27, 2003

(51) Int. Cl.[7] .............................. H01J 40/14; G09G 5/08
(52) U.S. Cl. ...................... 250/214 R; 250/221; 345/163
(58) Field of Search ........................... 250/214 R, 221, 250/222.1, 557, 231.13, 559.4; 345/163, 164, 165, 166, 167; 327/514, 515

(56) References Cited

U.S. PATENT DOCUMENTS 5,541,623 A * 7/1996 Engstrom .................... 345/165
6,222,182 B1 * 4/2001 Featherston et al. ... 250/231.13

* cited by examiner

Primary Examiner—Kevin Pyo
(74) Attorney, Agent, or Firm—Rabin & Berdo, P.C.

(57) ABSTRACT

An optical signal detection apparatus and method for a computer mouse compares two output signals of a first photo-transistor and a second photo-transistor to obtain a reference signal. Then a pulse signal generating unit utilizes the reference signal to generate a series of pulse signals each occurring when the voltage level of the reference signal is changed. Thereafter a sample and hold circuit samples and holds the voltage value of the output signals of the photo-transistors at the moments that pulse signals are generated. A dynamic reference voltage generating unit uses the sampled voltage values to calculate a dynamic reference voltage. The voltage level of the dynamic reference voltage is varied with the output signals of the photo-transistors. By using the dynamic reference voltage to compare with the output signals of the photo-transistors, the on/off statuses of the photo-transistors can be precisely detected.

10 Claims, 7 Drawing Sheets

OPTICAL SIGNAL DETECTION METHOD AND APPARATUS FOR A COMPUTER MOUSE

BACKGROUND OF THE INVENTION

1. Field of Invention

The present invention relates to an optical signal detection method and apparatus for a computer mouse, and more particularly to a detection technology which calculates a reference voltage signal based on the input signal from a moving mouse, to precisely determine the movement status of the mouse.

2. Related Art

Figure 7:
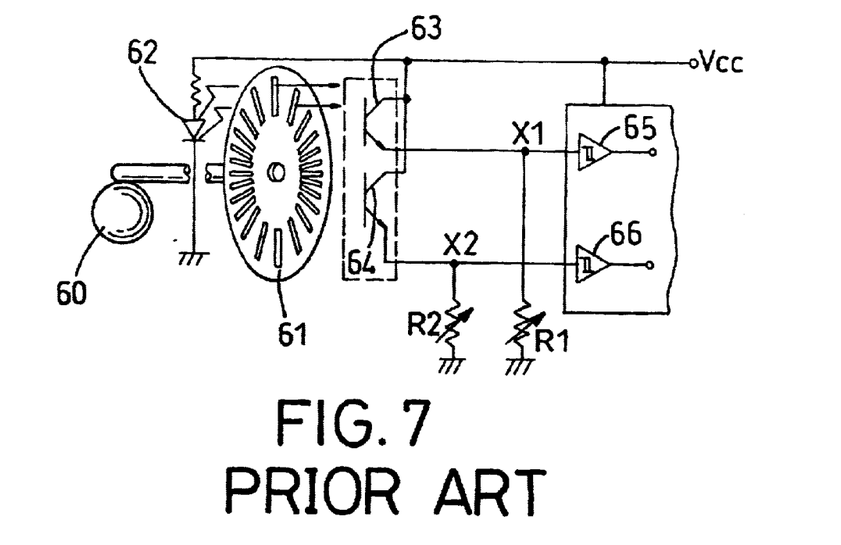
FIG. 7 is a part of a conventional signal detection circuit.

With reference to FIG. 7, a part of a conventional circuit, where only the X-axis detecting circuit is shown, for detecting the signals of a computer mouse comprises a roller ball (60), a disk (61) defined with multiple radially extending slits (not numbered), a light emission diode (62), two photo-transistors (63, 64) and two comparators (65, 66). The disk (61) is secured to a rotary shaft that is driven by the roller ball (60).

When a user operates the mouse, the rotary ball (60) transmits the disk (61) to rotate via the rotary shaft, whereby the two photo-transistors (63, 64) can be turned on/off by the discontinuous light signals that are emitted from the light emission diode (62) through the slits of the disk (61). By determining the phase difference of the two output signals ($X_1$, $X_2$) from the two photo-transistors (63, 64), the movement direction along the X-axis of the mouse is recognized. Furthermore, the detection of the movement direction along the Y-axis is achieved by another pair of photo-transistors (not shown). Since the operation of the Y-axis photo-transistor is substantially the same as the foregoing description, the explanation for the Y-axis photo-transistor is omitted.

Since the voltage level of the output signal from the two photo transistors (63, 64) will vary with the movement speed of the mouse, two rheostats ($R_1$, $R_2$) are provided to fine tune the voltage level. By choosing an appropriate resistance value of each rheostat ($R_1$, $R_2$), the voltage level can be properly controlled in the allowable range, so that the two comparators (65, 66) can be operated correctly.

However, since the reference voltage level of each comparator (65, 66) is predetermined, and the resistance value of each rheostat ($R_1$, $R_2$) is set as a proper constant value, once the voltage level of the output signals of each photo-transistor (63, 64) is over low or over high, the comparators (65, 66) can not correctly determine whether the photo-transistors (63, 64) are turned on or not. Thus the movement of the computer mouse can not be precisely presented.

Figure 8:
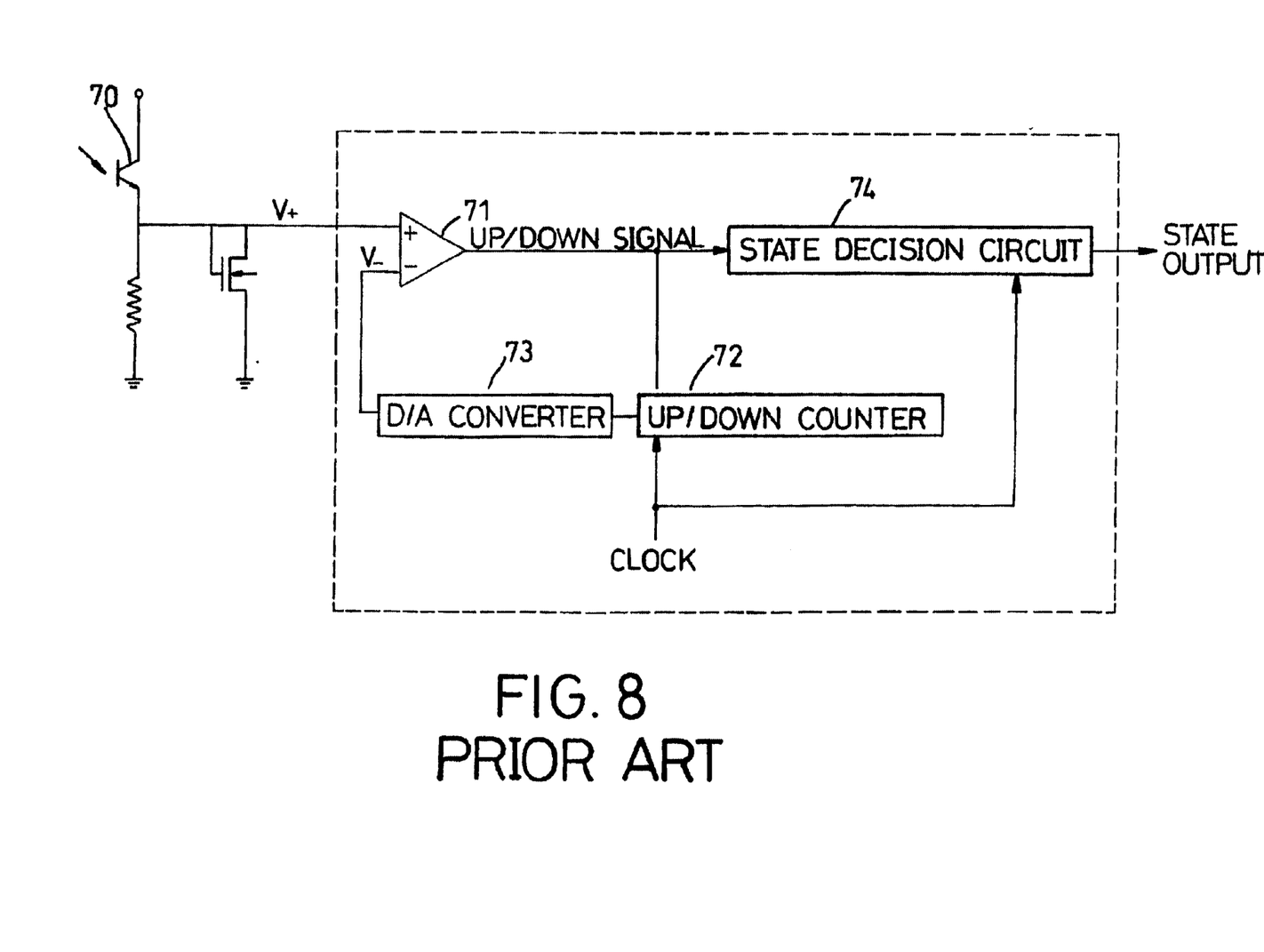
FIG. 8 is a circuit block diagram of a conventional signal detection circuit.

With reference to FIG. 8, to solve the foregoing problem, another conventional signal detection circuit has been developed. The circuit utilizes a comparator (71) to receive the output signal of a photo-transistor (70). A reference voltage (V−), which is input to a terminal denoted with "−", of the comparator (71) is a feedback signal, wherein the feedback signal is from the output of the comparator (71) which be further processed by an up/down counter (72) and a D/A converter (73). By using such a circuit design, the comparator (71) obtains a variable reference voltage (V−) based on the output signal of the photo-transistor (70). Although such a circuit design having the variable reference voltage can overcome the drawback of the foregoing circuit of FIG. 7, the entire circuit layout becomes more complex than that because the up/down counter (72) and the D/A converter (40) are involved. Further, the manufacturing cost of such a circuit is high.

To overcome the shortcomings, the present invention provides an optical signal detection method and apparatus for a computer mouse to mitigate and obviate the aforementioned problems.

SUMMARY OF THE INVENTION

An objective of the invention is to provide an optical signal detection method and apparatus for a computer mouse to calculate a variable reference voltage based on the output signal of the photo-transistor and to provide to a comparator, so as to make the comparator accurately determine the movement of the computer mouse.

Another objective of the invention is to provide an optical signal detection method and apparatus for a computer mouse to simplify the circuit design and reduce the production cost.

To achieve the objectives, the apparatus in accordance with the present invention comprises:

a comparator comparing a first output signal $X_1$ of a first photo-transistor with a second output signal $X_2$ of a second photo-transistor to output a reference signal;

a pulse signal generating unit connected to the output of the comparator to generate the pulse signals based on the rising edges or falling edges of the reference signal;

a sample and hold circuit connected to the output of the pulse signal generating unit, the first photo-transistor and the second transistor, to sample and hold the voltage value of the output signal of the two photo-transistors based on said pulse signals;

a dynamic reference voltage generating unit connected to the output of the sample and hold circuit to calculate a dynamic reference voltage according to the sampled and held voltage value;

wherein by comparing said dynamic reference voltage with the output signal of the photo transistors, digital signals representing the on/off statuses of the photo-transistors are accurately obtained, and the digital signals are further processed to determine the movement of the computer mouse.

Other objects, advantages and novel features of the invention will become more apparent from the following detailed description when taken in conjunction with the accompanying drawings.

DETAILED DESCRIPTION OF THE INVENTION

Figure 1:
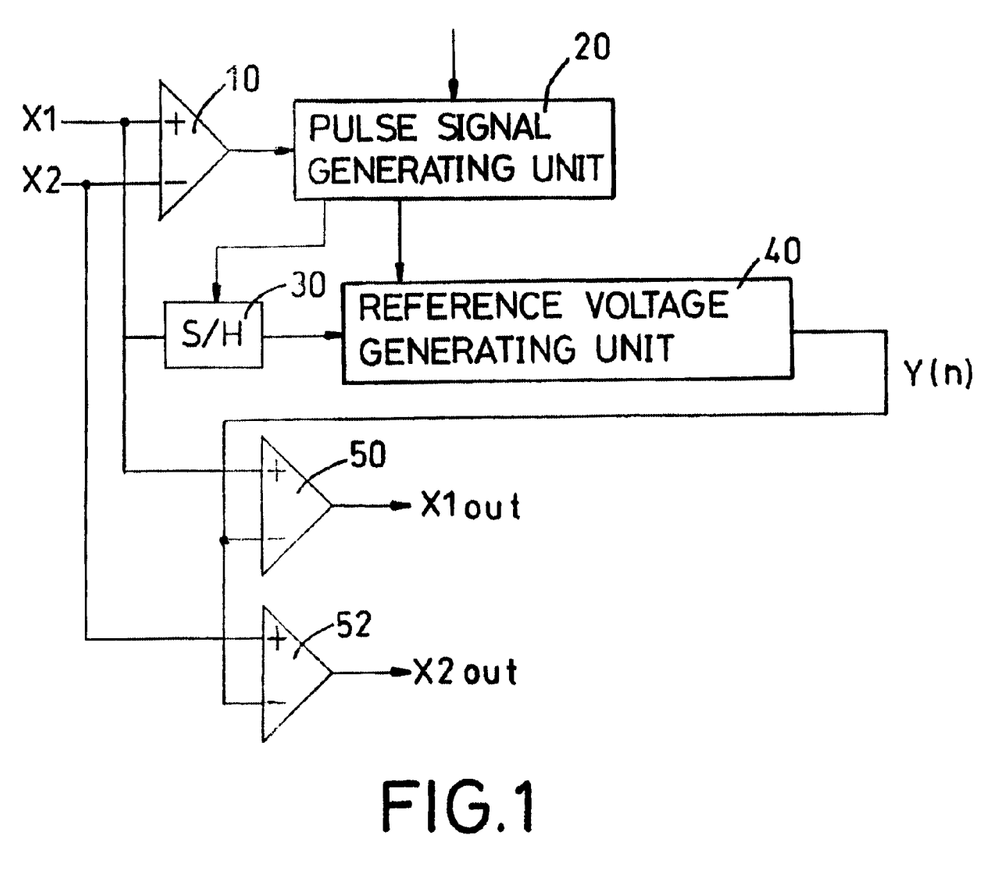
FIG. 1 is a circuit block diagram of a first embodiment of an optical signal detection apparatus for a computer mouse in accordance with the present invention.

With reference to FIG. 1, a first embodiment of an optical signal detection apparatus in accordance with the present invention comprises a first comparator (10) with an output, a pulse signal generating unit (20) connected to the output of the comparator (10), a sample and hold (S/H) circuit (30) connected to an output of the pulse signal generating unit (20), and a dynamic reference voltage generating unit (40) receiving output signals of the S/H circuit (30).

The input signals of the first comparator (10) denoted with "$X_1$" and "$X_2$" respectively represent the output signals of two photo-transistors (not shown) of the X-axis movement detection. The circuit design of Y-axis is the same as the X-axis, so only the description for X-axis movement detection is disclosed hereinafter.

Figure 2:
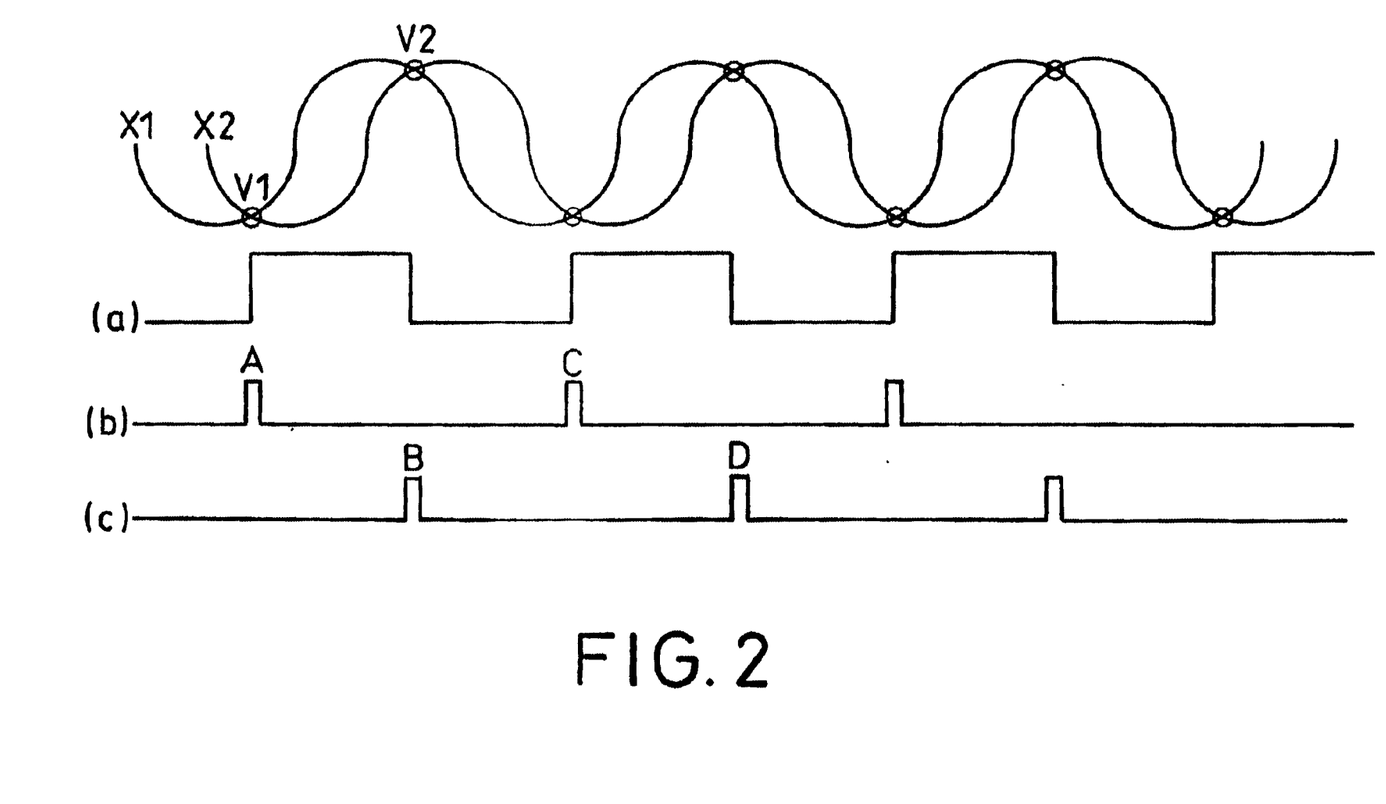
FIG. 2 is a waveform view shown output signals of two photo-transistors in accordance with the present invention.

With reference to FIGS. 1 and 2, by comparing the output signals ($X_1$, $X_2$) with each other by the comparator (10), a reference signal (a) with square waveform is output from the comparator (10). The change point of the voltage level of the reference signal (a), i.e. from low to high (the rising edge) or from low to high (the falling edge), occurs when the voltage of the two output signals are equal. The reference signal (a) is further input to the pulse signal generating unit (20). The pulse signal generating unit (20) employs the high frequency sampling means to detect the voltage level variation of the reference signal (a). Thereby the signal generating unit (20) will generate the pulse signals (b) or pulse signals (c) based on the rising edge or falling edge of the reference signal (a).

With reference to FIG. 2, the pulse signals (b) or (c) are further input to the sample and hold circuit (30). At the moment the pulse signals are generated, the voltage value of one of the output signals ($X_1$ or $X_2$) from the photo-transistors is sampled and held by the sample and hold circuit (30). Because the output voltage values of the two output signal $X_1$ and $X_2$ are equal at the moment that the pulse signals are generated, the sampled and held voltage value can be taken from whether the signal is $X_1$ or $X_2$. These sampled and held voltage values are further input to the dynamic reference voltage generating unit (40).

The dynamic voltage generating unit (40) employs a present sampled value X(n) and several former sampled values X(n−1), X(n−2), X(n−3) . . . , to calculate a dynamic reference voltage Y(n). The present invention provides two calculation ways (A) and (B) to obtain the dynamic reference voltage Y(n).

$$(A): Y(n) = \frac{1}{2} \cdot X(n) + \frac{1}{4} \cdot X(n-1) + \frac{1}{8} \cdot X(n-2) + \ldots$$

This formula uses the present sampled value X(n) and the former sampled values X(n−1), X(n−2), X(n−3) . . . to obtain the dynamic reference voltage Y(n). By rearranging the equation (A), the relationship between the reference voltage Y(n) and the sampled values can be rearranged to a transfer function:

$$Y(n) = \frac{\frac{1}{2}}{1 - \frac{1}{2}Z^{-1}}.$$

Based on the transfer function, the voltage generating unit (40) can be deemed as a low pass filter.

$$(B): Y(n) = \frac{1}{2} \cdot X(n) + \frac{1}{2} \cdot X(n-1)$$

The above formula only utilizes a present sampled value X(n) and a previous sampled value X(n−1) to calculate the dynamic reference voltage Y(n).

The transfer function of equation (B) can be rearranged as $$Y(n) = \frac{1}{2} + \frac{1}{2}Z^{-1}.$$

Furthermore, the sample and hold circuit (30) can be designed to perform two different sampling ways, i.e. the full cycle sample and the half cycle sample. The full cycle sample represent the sample action only occurs once at each complete cycle of the reference signal (a). With reference to FIG. 2, for example, if the sample and hold circuit (30) employs the full cycle sample way, the sample action occurs at the moment that pulse signals A, C are generated. Further the pulse signals (c) also can be employed to the full cycle sample way.

If the sample and hold circuit (30) adopts the half cycle sample way, both pulse signals (b) and (c) are together applied for sampling, i.e. the sample action occurs at the moment that pulse signals A, B, C and D are generated. It is noted that both the full cycle sample way and the half cycle sample way are suitable to be applied in the foregoing calculations (A) and (B).

Figure 3:
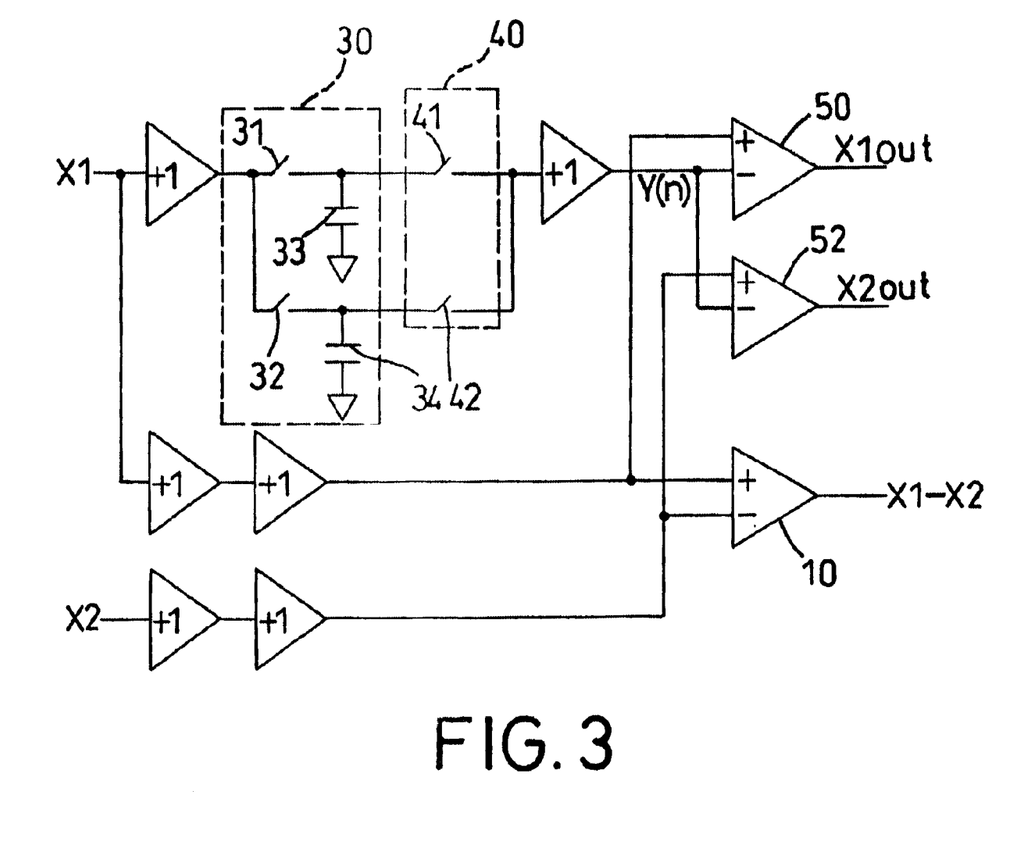
FIG. 3 is circuit diagram shown a reference voltage generating unit and a sample and hold circuit in accordance with the present invention.

With reference to FIG. 3, to implement the first calculation (A) described earlier, a practical circuit layout of the sample and hold circuit (30) and the reference voltage generating unit (40) comprises a first switch (31) and a second switch (32) to connect an input signal $X_1$ that is output from the photo-transistor (not shown). A first capacitor (33) and a second capacitor (34) are respectively connected to the first switch (31) and the second switch (32). A third switch (41) and a fourth switch (42) are further respectively connected to the two capacitors (33) (34).

With reference to FIGS. 2 and 3, if the sample and hold circuit (30) and the reference voltage generating unit (40) shown in FIG. 3 adopt the half cycle sample way, when the first pulse signal A is generated, the first switch (31) and the fourth switch (42) are quickly closed. Thus the voltage value (V1) of the signal $X_1$ is sampled and held in the first capacitor (33). The close time of the first switch (31) is determined by the pulse width of pulse signal A. When the second pulse signal B is generated, the second switch (32) and the third switch (41) are closed. The voltage value (V2) is sampled and stored in the second capacitor (34). The close time of the second switch (32) is determined by the pulse signal B. When the first switch (31) and the second switch (32) are both open, the third switch (41) and the fourth switch (42) are both closed. Thereby the two capacitors (33) (34) are deemed as connected in parallel. When two capacitors (33) (34) are connected in parallel, the voltage potential stored in the two capacitors (33) (34) are added together and averaged. Thus the dynamic reference voltage Y(n) is obtained. Since the input signal $X_1$ is not a constant voltage, the dynamic reference voltage Y(n) is varied with the input signal $X_1$.

Figure 4:
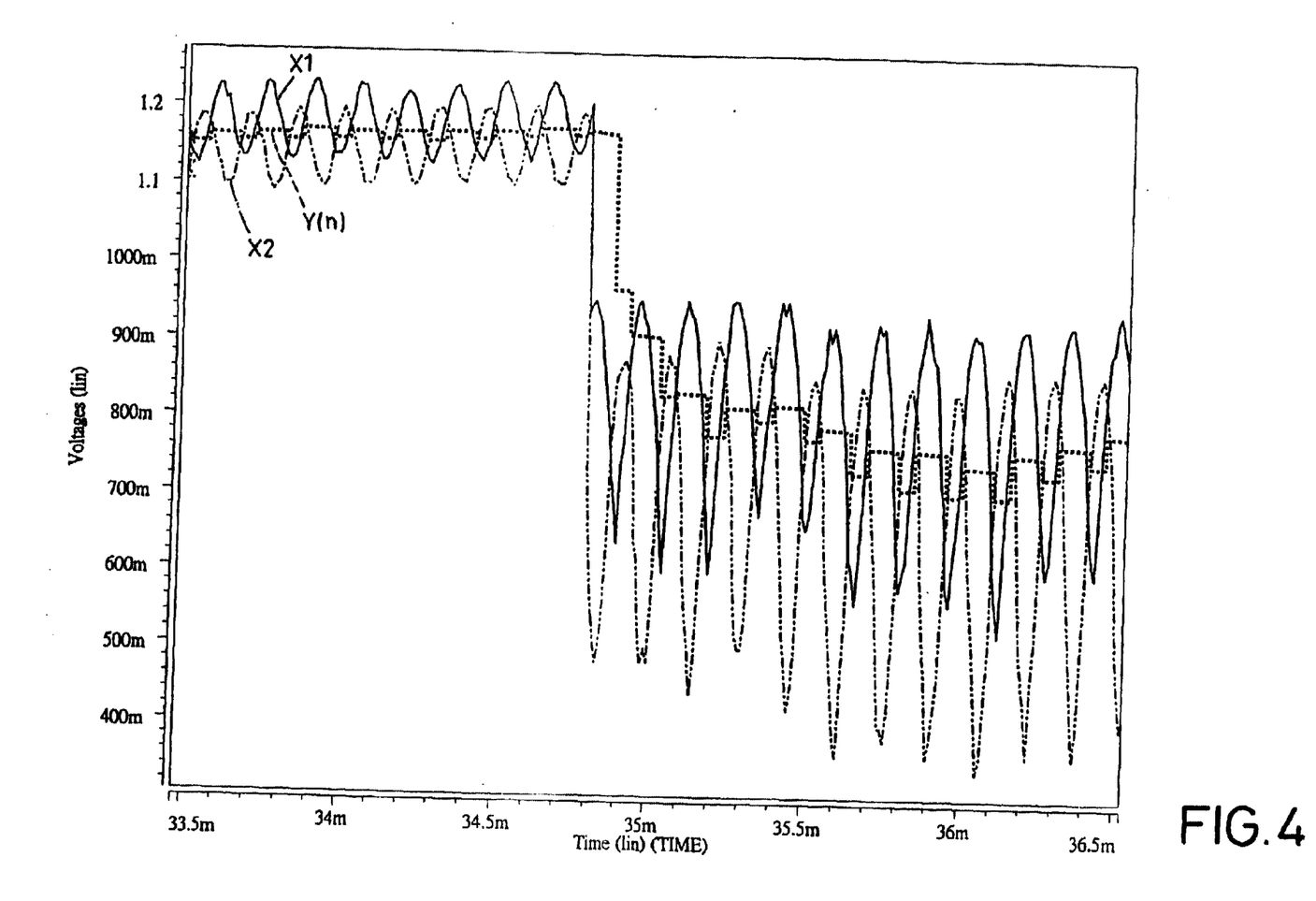
FIG. 4 is a waveform view of a calculated reference voltage in accordance with the present invention.

With reference to FIG. 4, the stimulated waveform chart represents the input signals (X1 and X2) and the dynamic reference voltage Y(n) that is calculated by the first calculation formula (A), where $$Y(n) = \frac{1}{2} \cdot X(n) + \frac{1}{4} \cdot X(n-1) + \frac{1}{8} \cdot X(n-2) + \ldots$$

Figure 5:
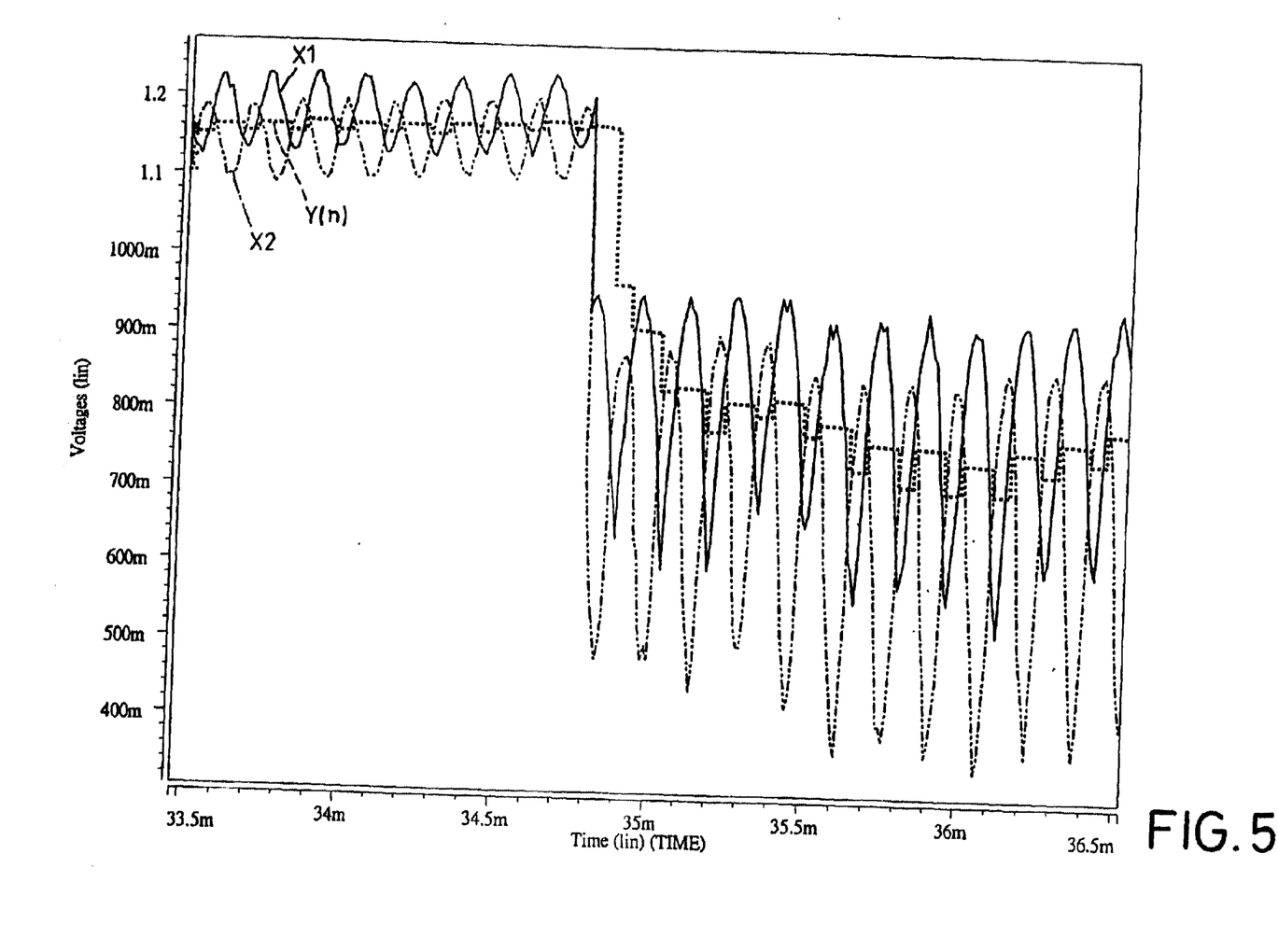
FIG. 5 is another waveform view of a calculated reference voltage in accordance with the present invention.

FIG. 5 is another stimulated waveform chart, wherein the dynamic reference voltage is calculated by the second calculation formula (B), where $$Y(n) = \frac{1}{2} \cdot X(n) + \frac{1}{2} \cdot X(n-1).$$

Whether the first calculation formula (A) or the second calculation formula (B), the dynamic reference voltage is proved to vary with the input signals $X_1$ and $X_2$.

With reference to FIG. 1 again, the calculated dynamic reference voltage Y(n) is further input to a second comparator (50) and a third comparator (52). The two comparators (50, 52) further respectively receive the input signals $X_1$ and $X_2$. Since the two comparators (50, 52) utilize the dynamic reference voltage Y(n) to compare with the input signals $X_1$ and $X_2$, the status (on/off) of the photo-transistors can be accurately detected. The output signals, which are the digital signal form, ($X_{1out}$ and $X_{2out}$) of the two comparators (50, 52), are further input to a coordinates calculating unit to determine the movement of the computer mouse.

Figure 6:
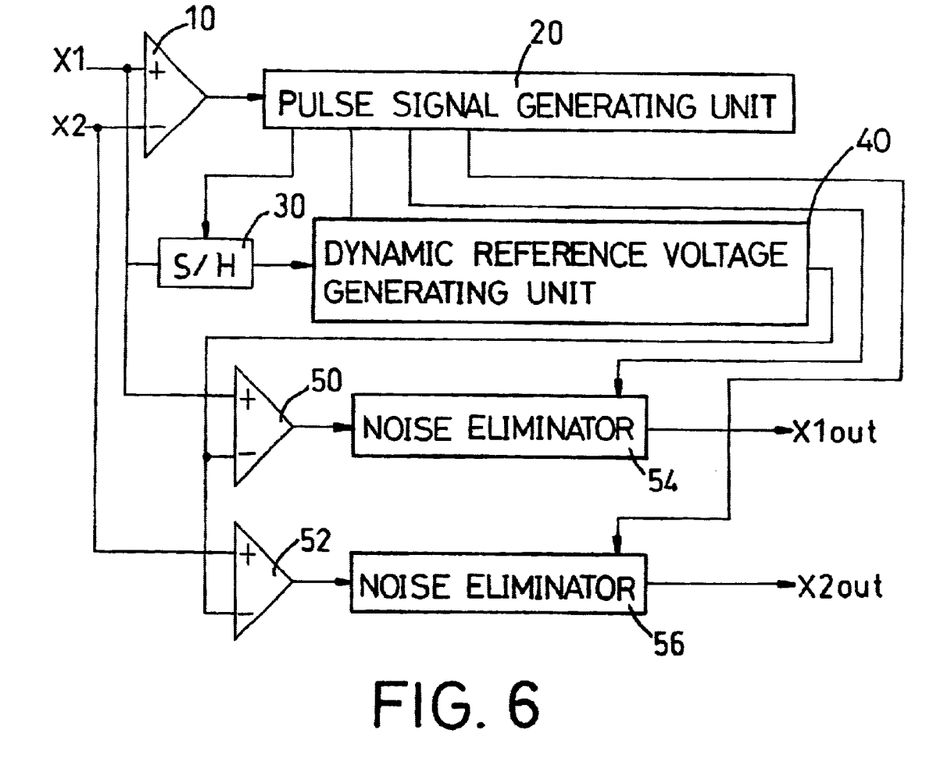
FIG. 6 is a block diagram of a second embodiment of an optical signal detection apparatus for a computer mouse in accordance with the present invention.

With reference to FIG. 6, the second embodiment of the present invention is substantially the same as the first embodiment of FIG. 1. The change is that the outputs of the two comparators (50, 52) are further respectively connected to a noise eliminator (54, 56) to filter the noises contained in the output signals.

The invention may be varied in many ways by a skilled person in the art. Such variations are not to be regarded as a departure from the spirit and scope of the invention, and all such modifications are intended to be included within the scope of the following claims.

What is claimed is:

1. An optical signal detection method for a computer mouse, the method comprising the steps of:

comparing a first signal output from a first photo-transistor with a second signal output from a second photo-transistor to obtain a reference signal with square waveform;

generating pulse signals that occur at the time that the voltage level of the reference signal is changed;

sampling and holding a series of voltage values of the first signal or the second signal at the time that the pulse signals generated, wherein at the moment that each pulse signal is generated, a voltage level of the first signal is the same as a voltage level of the second signal;

calculating a dynamic reference voltage signal based on the series of the sampled and held voltage values; and respectively comparing the dynamic reference voltage signal with the first signal and the second signal to obtain a first digital signal and a second digital signal, wherein the first digital signal and the second digital signal respectively represent the on/off statuses of the first photo-transistor and the second photo-transistor.

2. The method as claimed in claim 1, wherein the dynamic reference voltage signal is calculated by an equation $$Y(n) = \frac{1}{2} \cdot X(n) + \frac{1}{4} \cdot X(n-1) + \frac{1}{8} \cdot X(n-1) + \frac{1}{8} \cdot X(n-2) + \ldots ,$$

where Y(n) represents the dynamic reference voltage signal, and the X(n), X(n−1), X(n−2) . . . represent the sampled and held voltage values.

3. The method as claimed in claim 1, wherein the dynamic reference voltage signal is calculated by an equation $$Y(n) = \frac{1}{2} \cdot X(n) + \frac{1}{2} \cdot X(n-1),$$

where Y(n) represents the dynamic reference voltage signal, and the X(n) and X(n−1) respectively represent a present sampled and held voltage value and a previous sampled and held voltage value.

4. The method as claimed in claim 1, wherein the first digital signal and the second digital signal are further processed to eliminate noises contained in the first digital signal and the second digital signal.

5. An optical signal detection apparatus for a computer mouse, the detection apparatus comprising:

a first comparator to compare a first signal output from a first photo-transistor with a second signal output from a second photo-transistor to obtain a reference signal with square waveform;

a pulse generating unit connected to the first comparator to generated pulse signals that occur at the moment that the voltage level of the reference signal is changed;

a sample and hold circuit connected to an output of the pulse signal generating unit, the first photo-transistor and the second transistor, so as to sample and hold a series of voltage values of the first signal or the second signal at the time that the pulse signals are generated, wherein at the moment that each pulse signal is generated, a voltage level of the first signal is the same as a voltage level of the second signal;

a dynamic reference voltage generating unit connected to an output of the sample and hold circuit to calculate a dynamic reference voltage signal based on the series of the sampled and held voltage values;

a second comparator comparing the dynamic reference voltage signal with the first signal that outputs from the first photo-transistor to obtain a first digital signal that represents the on/off statuses of the photo-transistor; and a third comparator comparing the dynamic reference voltage signal with the second signal that outputs from the second photo-transistor to obtain a second digital signal that represents the on/off statuses of the photo-transistor.

6. The detection apparatus as claimed in claim 5, wherein the dynamic reference voltage signal is calculated by an equation $$Y(n) = \frac{1}{2} \cdot X(n) + \frac{1}{4} \cdot X(n-1) + \frac{1}{8} \cdot X(n-2) + \ldots ,$$

where Y(n) represents the dynamic reference voltage signal, and the X(n), X(n−1), X(n−2) . . . represent the sampled and held voltage values.

7. The detection apparatus as claimed in claim 5, wherein the dynamic reference voltage signal is calculated by an equation $$Y(n) = \frac{1}{2} \cdot X(n) + \frac{1}{2} \cdot X(n-1),$$

where Y(n) represents the dynamic reference voltage signal, and the X(n) and X(n−1) respectively represent a present sampled and held voltage value and a previous sampled and held voltage value.

8. The detection apparatus as claimed in claim 5, wherein the dynamic reference voltage signal is deemed as a low pass filter with a transfer function H(z), $$\frac{Y(Z)}{X(Z)} = H(Z)$$

where Y(z) represents the dynamic voltage signal, X(z) represents the series of sampled and held values.

9. The detection apparatus as claimed in claim 5, wherein the output of the second comparator and the third comparator respectively connect a noise eliminator to eliminate noises contained in the first digital signal and the second digital signal.

10. The detection apparatus as claimed in claim 5, wherein the sample and hold circuit is composed of two switches and two capacitors.

* * * * *